(12) United States Patent
Lu et al.

(10) Patent No.: US 11,119,730 B1
(45) Date of Patent: Sep. 14, 2021

(54) ELIMINATION OF ROUNDING ERROR ACCUMULATION

(71) Applicants: Jizhu Lu, Redmond, WA (US); Lihang Lu, Redmond, WA (US)

(72) Inventors: Jizhu Lu, Redmond, WA (US); Lihang Lu, Redmond, WA (US)

(73) Assignee: CLOUD & STREAM GEARS LLC, Redmond, WA (US)

( * ) Notice: Subject to any disclaimer, the term of this patent is extended or adjusted under 35 U.S.C. 154(b) by 167 days.

(21) Appl. No.: 16/365,672

(22) Filed: Mar. 27, 2019

Related U.S. Application Data

(60) Provisional application No. 62/648,384, filed on Mar. 26, 2018.

(51) Int. Cl.
*G06F 7/499* (2006.01)

(52) U.S. Cl.
CPC .................. *G06F 7/49947* (2013.01)

(58) Field of Classification Search
CPC .................................................. G06F 7/49947
See application file for complete search history.

(56) References Cited

U.S. PATENT DOCUMENTS

| | | | |
|---|---|---|---|
| 6,622,105 | B2 | 9/2003 | Determan |
| 7,251,584 | B1 | 7/2007 | Perazolo et al. |
| 7,512,919 | B2 | 5/2009 | Visweswariah |
| 7,747,413 | B2 | 6/2010 | Ramsey et al. |
| 7,840,377 | B2 | 11/2010 | Ramsey et al. |
| 7,853,545 | B2 | 12/2010 | Chang |
| 7,853,630 | B2 | 12/2010 | Martino et al. |
| 8,200,677 | B2 | 6/2012 | Martino et al. |
| 8,825,447 | B2 | 9/2014 | Gouthaman et al. |
| 8,868,754 | B1 | 10/2014 | Pai |
| 9,069,726 | B2 | 6/2015 | Lu |
| 9,186,101 | B2 | 11/2015 | Rodriguez-Llorente et al. |
| 9,239,887 | B2 | 1/2016 | Johnston et al. |
| 9,254,112 | B2 | 2/2016 | Tryggestad et al. |
| 9,285,230 | B1 | 3/2016 | Silver et al. |
| 9,336,116 | B2 | 5/2016 | Gouthaman et al. |
| 9,363,329 | B1 | 6/2016 | Kolam |
| 9,558,196 | B2 | 1/2017 | Johnston et al. |
| 9,760,539 | B1 | 9/2017 | Lu |
| 9,928,215 | B1 | 3/2018 | Lu |
| 9,959,248 | B1 | 5/2018 | Lu |
| 9,967,195 | B1 | 5/2018 | Lu |

(Continued)

*Primary Examiner* — Michael D. Yaary

(57) ABSTRACT

The present invention extends to methods, systems, and computing system program products for elimination of rounding error accumulation in iterative calculations for Big Data or streamed data. Embodiments of the invention include iteratively calculating a function for a primary computation window of a pre-defined size while incrementally calculating the function for one or more backup computation windows started at different time points and whenever one of the backup computation windows reaches a size of the pre-define size, swapping the primary computation window and the backup computation window. The result(s) of the function is/are always generated by the iterative calculation performed for the primary computation window. Elimination of rounding error accumulation enables a computing system to steadily and smoothly run iterative calculations for unlimited number of iterations without rounding error accumulation.

20 Claims, 5 Drawing Sheets

(56) References Cited

U.S. PATENT DOCUMENTS

| | | |
|---|---|---|
| 9,979,659 B1 | 5/2018 | Lu |
| 9,985,895 B1 | 5/2018 | Lu |
| 10,079,910 B1 | 9/2018 | Lu |
| 10,162,856 B1 | 12/2018 | Lu |
| 10,178,034 B1 | 1/2019 | Lu |
| 10,191,941 B1 | 1/2019 | Lu |
| 10,225,308 B1 | 3/2019 | Lu |
| 10,235,414 B1 | 3/2019 | Lu |
| 10,235,415 B1 | 3/2019 | Lu |
| 10,248,690 B1 | 4/2019 | Lu |
| 10,262,031 B1 | 4/2019 | Lu |
| 10,275,488 B1 | 4/2019 | Lu |
| 10,282,445 B1 | 5/2019 | Lu |
| 2014/0164456 A1 | 6/2014 | Lu |
| 2014/0172936 A1* | 6/2014 | Tomono .............. G06F 9/30014 708/505 |
| 2014/0297821 A1 | 10/2014 | Lvin |
| 2014/0351648 A1 | 11/2014 | Madani et al. |
| 2016/0110417 A1 | 4/2016 | Lakshminarayan et al. |
| 2016/0126975 A1* | 5/2016 | Lutz ........................ H03M 7/24 708/204 |
| 2016/0217055 A1 | 7/2016 | Gouthaman et al. |
| 2017/0139676 A1* | 5/2017 | Lutz .......................... G06F 7/02 |

* cited by examiner

ELIMINATION OF ROUNDING ERROR ACCUMULATION

CROSS-REFERENCE TO RELATED APPLICATIONS

This application claims the benefit of provisional patent application Ser. No. 62/648,384, filed on 2018 Mar. 26.

BACKGROUND AND RELEVANT ART

Internet, mobile communications, navigation, online gaming, sensing technologies and large scale computing infrastructures are producing large amounts of data every day. Big Data is data that is beyond the processing capacity of conventional database systems and analyzing capacity of traditional analyzing methods due to its large volume and fast moving and growing speed. More companies now rely on Big Data and/or streamed data to make real-time decisions to solve various problems. Current methods involve utilizing a lot of computational resources, which are very costly, yet still may not satisfy the needs of real-time decision making based on the newest information, especially in the financial industry. Iterative calculation is an effective method to reuse previous calculation results and avoid repeatedly data access and redundant calculations, and therefore can efficiently, promptly and cost-effectively process and analyze Big Data. However, rounding errors can be accumulated during the iterative calculation process. Re-calculating initial values for iterative calculations can avoid the rounding error issues, however the initial value calculation may be very costly and may fail to meet real-time data processing requirements. A method to overcome the rounding error accumulation issue and provide efficient, steady iterative calculations is needed.

BRIEF SUMMARY

The present disclosure describes methods, systems, and computing system program products for elimination of rounding error accumulation in iterative calculations for Big Data or streamed data on a computing-device-based computing system. A computing-device-based computing system comprises one or more computing devices and one or more storage media. Each of the one or more computing devices comprises one or more processors. Elimination of rounding error accumulation is a specially designed process and mechanism to re-initialize components used in iterative calculation, so that the rounding errors accumulated in the iterative calculation process are eliminated instead of becoming larger and larger. Embodiments of the invention include iteratively calculating a function for a primary computation window of a pre-defined size while incrementally calculating the function for one or more backup computation windows started at different time points and whenever one of the backup computation windows reaches the pre-defined size, changing the primary computation window to a backup computation window and changing the backup computation window with the pre-defined size to a primary computation window. The result(s) of the function is/are always generated by the iterative calculation performed for the primary computation window. Elimination of rounding error accumulation enables the computing-device-based computing system to steadily and smoothly run iterative calculations for unlimited number of iterations without rounding error accumulation.

As used herein, a component of a function is a quantity or expression appearing in the function's definition equation or any transforms of the definition equation. A function may be calculated based on its one or more components.

As used herein, a data source may be a live data stream or a storage medium.

The computing system initializes one or more components of a function for a pre-modified primary computation window of one or more data sources accessible by the computing-device-based computing system, wherein the pre-modified primary computation window contains a specified number, n (n>1), of groups of data elements and each group of data elements contains k (k≥1) data element from the one or more data sources.

The computing system initializes one or more components of the function for each of one or more, l (l≥1), pre-modified backup computation windows.

The computing system accesses, from the one or more data sources, r (r≥1) groups of data elements to be added to the pre-modified primary computation window, wherein each group comprises k data elements.

The computing system stores the accessed r groups of data elements in one or more data buffers. This is an optional operation which is only performed when the one or more data sources comprise a live data stream.

The computing system modifies the pre-modified primary computation window by removing the earliest r groups of data element(s) from the pre-modified primary computation window; and adding the to-be-added r groups of data element(s) to the pre-modified primary computation window.

The computing system modifies each respective pre-modified backup computation window of the l pre-modified backup computation windows one by one. Modifying each respective pre-modified backup computation window is done by adding the to-be-added r groups of data element(s) to each respective pre-modified backup computation window and modifying each respective pre-modified backup computation window's size by adding r.

The computing system iteratively derives one or more components of the function for the modified primary computation window based on the one or more components of the function for the pre-modified primary computation window.

The computing system incrementally derives one or more components of the function for each modified backup computation window of the l modified backup computation windows one by one based on the one or more components of the function for the corresponding pre-modified backup computation window.

The computing system may generate one or more computing results of the function for the modified primary computation window based on one or more of the iteratively derived components when the one or more computing results are accessed.

The computing system, whenever any one of the l modified backup computation windows reaches a size equal to n, exchanges the modified primary computation window and the one modified backup computation window with size n by indicating the one modified backup computation window as a pre-modified primary computation window and resetting the modified primary computation window to a pre-modified backup computation window, wherein the resetting comprises resetting the modified primary computation window to contain the latest n (mod r) groups of data elements, setting the modified primary computation window size to n (mod r), indicating the modified primary computation window as a pre-modified backup computation window, and initializing one or more components of the function for the pre-modified backup computation window.

The computing system may keep accessing r groups of data elements to be added to the pre-modified primary computation window, modifying the pre-modified primary computation window, modifying the l pre-modified backup computation windows one by one, iteratively deriving one or more components of the function for the modified primary computation window, incrementally deriving one or more components of the function for the l modified backup computation windows one by one, generating one or more computing results of the function for the modified primary computation window, and exchanging the modified primary computation window and a modified backup computation window whenever a modified backup computation window reaches a size equal to n. The computing system may repeat this process for as many times as needed, e.g., for a pre-defined number of times or until the computing system is instructed to stop the process.

This summary is provided to introduce a selection of concepts in a simplified form that are further described below in the Detailed Description. This summary is not intended to identify primary features or essential features of the claimed subject matter, nor is it intended to be used as an aid in determining the scope of the claimed subject matter.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention may be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION

Figure 1:
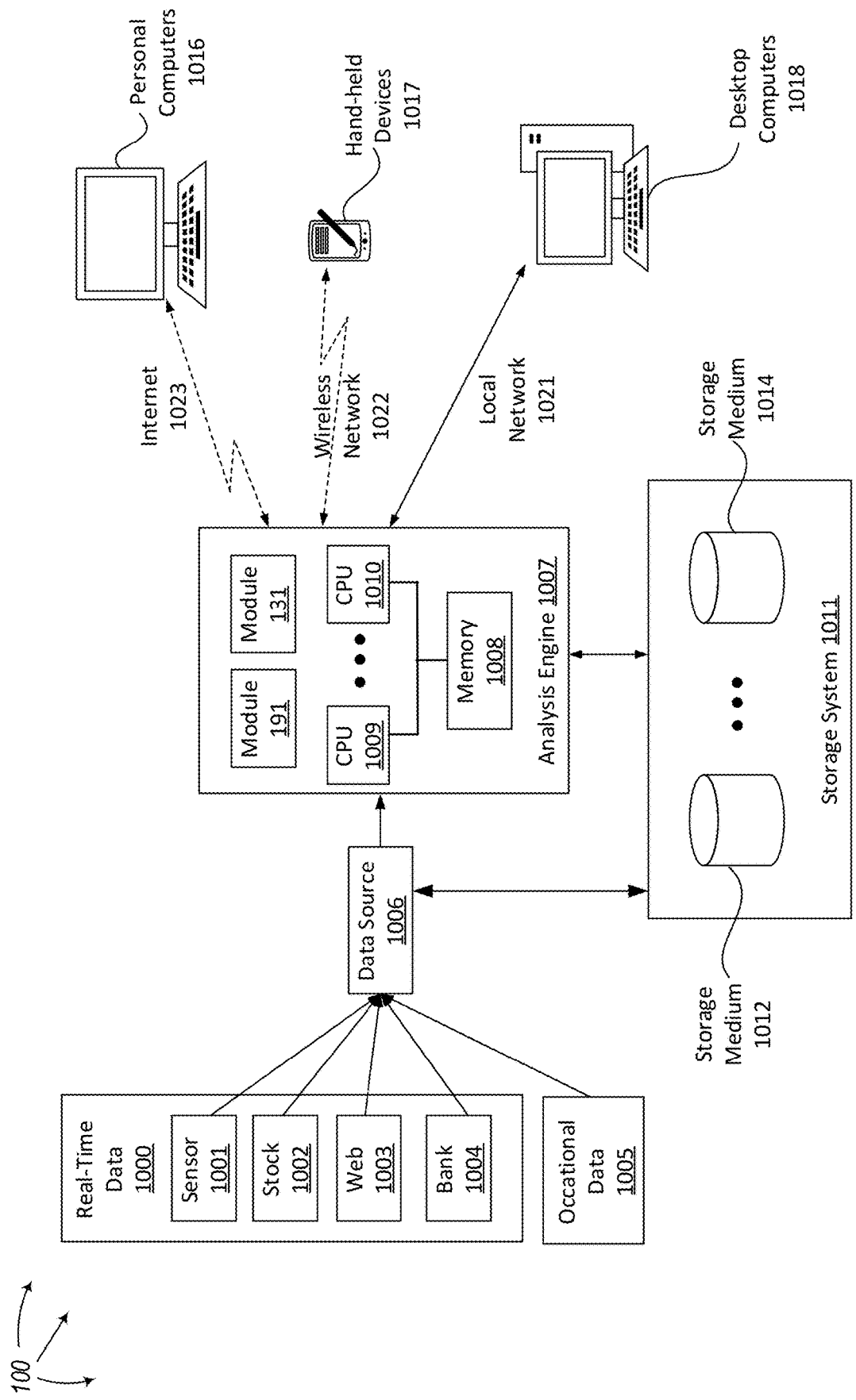
FIG. 1 illustrates a high-level overview of a computing system that facilitates performing iterative calculations for Big Data or streamed data.

The present disclosure describes methods, systems, and computing system program products for elimination of rounding error accumulation in iterative calculations for Big Data or streamed data on a computing-device-based computing system. A computing-device-based computing system comprises one or more computing devices and one or more storage media. Each of the one or more computing devices comprises one or more processors. Elimination of rounding error accumulation is a specially designed process and mechanism to re-initialize components used in iterative calculation, so that the rounding errors accumulated in the iterative calculation process are eliminated instead of becoming larger and larger. Embodiments of the invention include iteratively calculating a function for a primary computation window of a pre-defined size while incrementally calculating the function for one or more backup computation windows started at different time points and whenever one of the backup computation windows reaches the pre-define size, changing the primary computation window to a backup computation window and changing the backup computation window with the pre-defined size to a primary computation window. The result(s) of the function is/are always generated by the iterative calculation performed for the primary computation window. Elimination of rounding error accumulation enables the computing-device-based computing system steadily and smoothly running iterative calculation for unlimited number of iterations without rounding error accumulation.

As used herein, a component of a function is a quantity or expression appearing in the function's definition equation or any transforms of the definition equation. A function comprises one or more components. A function itself may be considered as the largest component of a function. A function may be calculated based on its one or more components.

Embodiments of the invention include simultaneously calculating one or more components of a function for multiple computation windows with different computation window sizes. Those different sizes are pre-defined and maintained by the computing system. All the pre-defined computation window sizes are different, which includes a pre-defined full computation window size and a pre-defined smallest computation window size. One of the multiple computation windows has a pre-defined full size, a computation window size for iterative calculation, and is called primary computation window on which iterative calculation of the one or more components of the function is performed. All other computation windows with smaller computation window sizes are called backup computation windows on which incremental calculation of the one or more components of the function is performed. When one of the backup computation windows on which incremental calculation is performed has its size reached the pre-defined full size, the computing system will change the primary computation window to a backup computation window by resetting its size to the pre-defined smallest computation window size and change the backup computation window to primary computation window. The computing system always use the computing result of the function generated for the primary computation window as the computing result of the function.

A function may require k (k≥1) inputs (e.g., k data elements from k variables). For example, for single variable functions, such as variance, standard deviation, skewness, kurtosis, and autocorrelation, when performing iterative calculation on true data streaming, a single data element is needed as input, i.e., k=1. For two variable functions, such as covariance, correlation, and simple linear regression, data elements from two variables are needed as input, i.e., k=2. In other words, when performing iterative calculation on true data steaming, at each time point, a group of 2 data elements is needed as input for those two variable functions. Similarly, for a function like multiple linear regression, at each time point, a group of k data elements may be needed as input. Depends on the practical needs, iterative calculation may be performed as soon as any new data element(s) is/are collected at a single time point or after a certain period of time during which new data elements have been collected over multiple time points. Assuming the number of time points at which new data element(s) is/are collected is r (r≥1), a total number of r×k data elements are added to a primary computation window and a total number of r×k data elements are removed from the primary computation window in each iteration of iterative calculation. For micro batch iterative calculation, the input data to a function are collected over a period of time comprising multiple (r, r>1) collecting time points. In this case, the input to the function may comprise a r×k matrix, or k vectors and each vector has a length of r, or r vectors and each vector has a length of k, or r groups of data elements and each group comprises k data elements. In the present disclosure, for simplicity of description, an input comprising r groups of data elements and each group comprising k data elements is used to cover all the cases of input mentioned above. The quickest update to a computation window is whenever a new single data for each variable is coming the computation window is updated. Thus, for iteratively calculating a function requiring k inputs, the quickest update is adding a group of k data elements to the computation window and removing a group of k data elements from the computation window. This is the case of true data streaming, i.e., r=1. It is noted that data elements from more than one variables may be combined into a single data steam. Thus, the input of a function may come from a single data source which comprises data elements of k variables, and the input may also come from k data sources and each data source comprises data elements of one variable. Thus, for simplicity of description, assume a pre-modified primary computation window of a specified size n (n>1) contains n groups of data elements and each group of data elements comprises k data elements from one or more (from 1 to up to k) data sources, and, for each iteration of iterative calculation, the earliest accessed r (r≥1) groups of data elements are removed from the pre-modified primary computation window and newly accessed r groups of data elements are added to the pre-modified primary computation window.

As used herein, a data source may be a live data stream or a storage medium.

The computing system initializes one or more components of a function for a pre-modified primary computation window of one or more data sources accessible by the computing-device-based computing system, wherein the function in each iteration takes a total number of r×k (r≥1, k≥1) data elements as input.

The computing system initializes one or more components of the function for each of one or more, l (l≥1), pre-modified backup computation windows of the one or more data sources in the following ways:

(a) The computing system initializes one or more components of the function for each of l pre-modified backup computation windows of the one or more data sources at the same time point but with different sizes, wherein the $i^{th}$ pre-modified backup computation window has a size of $m_i$ ($0 \leq m_i < n$, $(n-m_i) \pmod r = 0$, $m_i \neq m_j$ when $i \neq j$, $1 \leq i, j \leq l$) and contains the latest $m_i$ groups of data elements and each group comprises k data elements from the one or more data sources; or (b) The computing system initializes one or more components of the function for each of l pre-modified backup computation windows of the one or more data sources at different time points with same sizes, wherein the one or more pre-modified backup computation windows start at different time points and each pre-modified backup computation window has an initial size of n (mod r) and comprises the latest n (mod r) groups of data elements and each group comprises k data elements from the one or more data sources at each respective starting time point; or (c) The computing system initializes one or more components of the function for each of l pre-modified backup computation windows of the one or more data sources in a way of combining (a) and (b).

The computing system accesses, from the one or more data sources, r groups of data elements to be added to the pre-modified primary computation window, wherein each group of data elements comprises k data elements.

The computing system stores, the accessed r groups of data elements in one or more (from 1 to up to k) data buffers. This is an optional operation which is only performed when the one or more data sources comprise a live data stream (not streamed from a storage medium).

The computing system modifies the pre-modified primary computation window by removing the to-be-removed groups of data element(s) from the pre-modified primary computation window; and adding the to-be-added groups of data element(s) to the pre-modified primary computation window.

The computing system modifies each respective pre-modified backup computation window of the l pre-modified backup computation windows one by one. Modifying the respective one pre-modified backup computation window is done by adding the to-be-added r groups of data element(s) to the respective one pre-modified backup computation window and modifying the respective one pre-modified backup computation window's size by adding r.

The computing system iteratively derives one or more components of the function for the modified primary computation window based on the one or more components of the function for the pre-modified primary computation window.

The computing system incrementally derives one or more components of the function for each modified backup computation window of the l modified backup computation windows one by one based on the one or more components of the function for the corresponding pre-modified backup computation window.

The computing system may generate one or more computing results of the function for the modified primary computation window based on one or more of the iteratively derived components.

The computing system keeps accessing r groups of data elements, modifying the primary computation window and the one or more backup computation windows, deriving multiple components of the function, and generating one or more results of the function for the modified primary computation window until any one of the l modified backup computation windows reaches a size equal to n−r.

Then, the computing system accesses r groups of data elements, modify the primary computation window and the one or more backup computation windows, and derive multiple components of the function.

The computing system generates one or more results of the function for a computation window with a size n based on one or more of the derived components for the computation window.

The computing system exchanges the modified primary computation window and a modified backup computation window with size n by indicating the modified backup computation window as a pre-modified primary computation window and resetting the modified primary computation window to a pre-modified backup computation window, wherein the resetting comprises resetting the modified primary computation window to contain the latest n (mod r) groups of data elements, setting the modified primary computation window size to n (mod r), indicating the modified primary computation window as a pre-modified backup computation window, and initializing one or more components of the function for the pre-modified backup computation window.

The process mentioned above without the two initialization steps may be repeated for as many times as needed.

Embodiments of the present invention may comprise or utilize a special purpose or general-purpose computing device including computing device hardware, such as, for example, one or more processors and storage devices, as discussed in greater detail below. Embodiments within the scope of the present invention also include physical and other computing device-readable media for carrying or storing computing device-executable instructions and/or data structures. Such computing device-readable media may be any available media that may be accessed by a general purpose or special purpose computing device. Computing device-readable media that store computing device-executable instructions are computing device storage media (devices). Computing device-readable media that carry computing device-executable instructions are transmission media. Thus, by way of example, and not limitation, embodiments of the invention can comprise at least two distinctly different kinds of computing device-readable media: computing device storage media (devices) and transmission media.

Computing device storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which may be used to store desired program code means in the form of computing device-executable instructions or data structures and which may be accessed by a general purpose or special purpose computing device.

A "network" is defined as one or more data links that enable the transport of electronic data between computing devices and/or modules and/or other electronic devices. When information is transferred or provided over a network or another communications connection (either hardwired, wireless, or a combination of hardwired or wireless) to a computing device, the computing device properly views the connection as a transmission medium. Transmissions media can include a network and/or data links which may be used to carry desired program code means in the form of computing device-executable instructions or data structures and which may be accessed by a general purpose or special purpose computing device. Combinations of the above should also be included within the scope of computing device-readable media.

Further, upon reaching various computing device components, program code means in the form of computing device-executable instructions or data structures may be transferred automatically from transmission media to computing device storage media (devices) (or vice versa). For example, computing device-executable instructions or data structures accessed over a network or data link may be buffered in RAM within a network interface module (e.g., a "NIC"), and then eventually transferred to computing device RAM and/or to less volatile computing device storage media (devices) at a computing device. Thus, it should be understood that computing device storage media (devices) may be included in computing device components that also (or even primarily) utilize transmission media.

Computing device-executable instructions comprise, for example, instructions and data which, when executed at a processor, cause a general purpose computing device, special purpose computing device, or special purpose processing device to perform a certain function or group of functions. The computing device executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that embodiments of the present invention may be practiced in network computing environments with many types of computing device configurations, including, personal computers, desktop computers, laptop computers, message processors, hand-held devices, multi-processor systems, microprocessor-based or programmable consumer electronics, network PCs, mini-computers, mainframe computers, supercomputers, mobile telephones, PDAs, tablets, pagers, routers, switches, and the like. Embodiments of the present invention may also be practiced in distributed system environments where local and remote computing devices, which are linked (either by hardwired data links, wireless data links, or by a combination of hardwired and wireless data links) through a network, both perform tasks. In a distributed system environment, program modules may be located in both local and remote memory storage devices.

Embodiments of the invention can also be implemented in cloud computing environments. In this description and the following claims, "cloud computing" is defined as a model for enabling on-demand network access to a shared pool of configurable computing resources. For example, cloud computing may be employed in the marketplace to offer ubiquitous and convenient on-demand access to the shared pool of configurable computing resources. The shared pool of configurable computing resources may be rapidly provisioned via virtualization and released with low management effort or service provider interaction, and then scaled accordingly.

A cloud computing model may be composed of various characteristics such as, for example, on-demand self-service, broad network access, resource pooling, rapid elasticity, measured service, and so forth. A cloud computing model can also expose various service models, such as, for example, Software as a Service ("SaaS"), Platform as a Service ("PaaS"), and Infrastructure as a Service ("IaaS"). A cloud computing model can also be deployed using different deployment models such as private cloud, community cloud, public cloud, hybrid cloud, and so forth. In this description and in the claims, a "cloud computing environment" is an environment in which cloud computing is employed.

Iterative calculation reuses some previously calculated results to generate new results and thus improves the computing efficiency and reduces computing resource requirements, which makes it possible to perform data analysis at the place where data are generated and collected. Therefore, the embodiments of the invention may also be implemented for edge computing.

Regarding how to incrementally calculate a function, U.S. Pat. Nos. 9,760,539 and 10,162,856 may be used as examples for reference. Regarding how to iteratively calculate a function, U.S. Pat. Nos. 9,928,215, 9,959,248, 9,967,195, 10,079,910, 10,178,034, 10,191,941, 10,235,414, and 10,235,415 may be used as examples for reference.

Several examples will be given in the following sections.

The present invention may be embodied in other specific forms without departing from its spirit or essential characteristics. The described embodiments are to be considered in all respects only as illustrative and not restrictive.

FIG. 1 illustrates a high-level overview of an example computing system 100 that facilitates iteratively calculating a function for Big Data or streamed data. Referring to FIG. 1, computing system 100 comprises multiple devices connected by different networks, such as local network 1021, wireless network 1022, and internet 1023. The multiple devices include, for example, a data analysis engine 1007, a storage system 1011, live data stream 1006, and multiple distributed computing devices that may schedule data analysis tasks and/or query data analysis results, such as personal computer 1016, hand-held devices 1017 and desktop computer 1018, etc. Data analysis engine 1007 may comprise one or more processors, e.g., CPU 1009 and CPU 1010, one or more system memory, e.g., system memory 1008, and component calculation modules 191 and 131. Storage system 1011 may comprise one or more storage media, e.g., storage medium 1012 and storage medium 1014, which may be used for hosting Big Data sets. Data sets on storage system 1011 may be accessed by data analysis engine 1007. In general, data stream 1006 may comprise streamed data from different data sources, for example, stock quotes, audio data, video data, geospatial data, web data, mobile communication data, online gaming data, banking transaction data, sensor data, closed-captioning data, etc. To depict a few, real-time data 1000 may comprise data collected from sensor 1001, stock 1002, web 1003 and bank 1004, etc. in real-time. Data analysis engine 1007 may access data elements from data stream 1006. Data from different data streams may also be stored in storage system 1011 which may be accessed for Big Data analysis. It should be understood that FIG. 100 is provided to introduce a selection of concepts in a much simplified form, for example, distributed devices 1016 and 1017 may need to go through a firewall to connect data analysis engine 1007, and data accessed from data stream 1006 and/or storage system 1011 by data analysis engine 1007 may be filtered by data filters, etc.

Figure 2A:
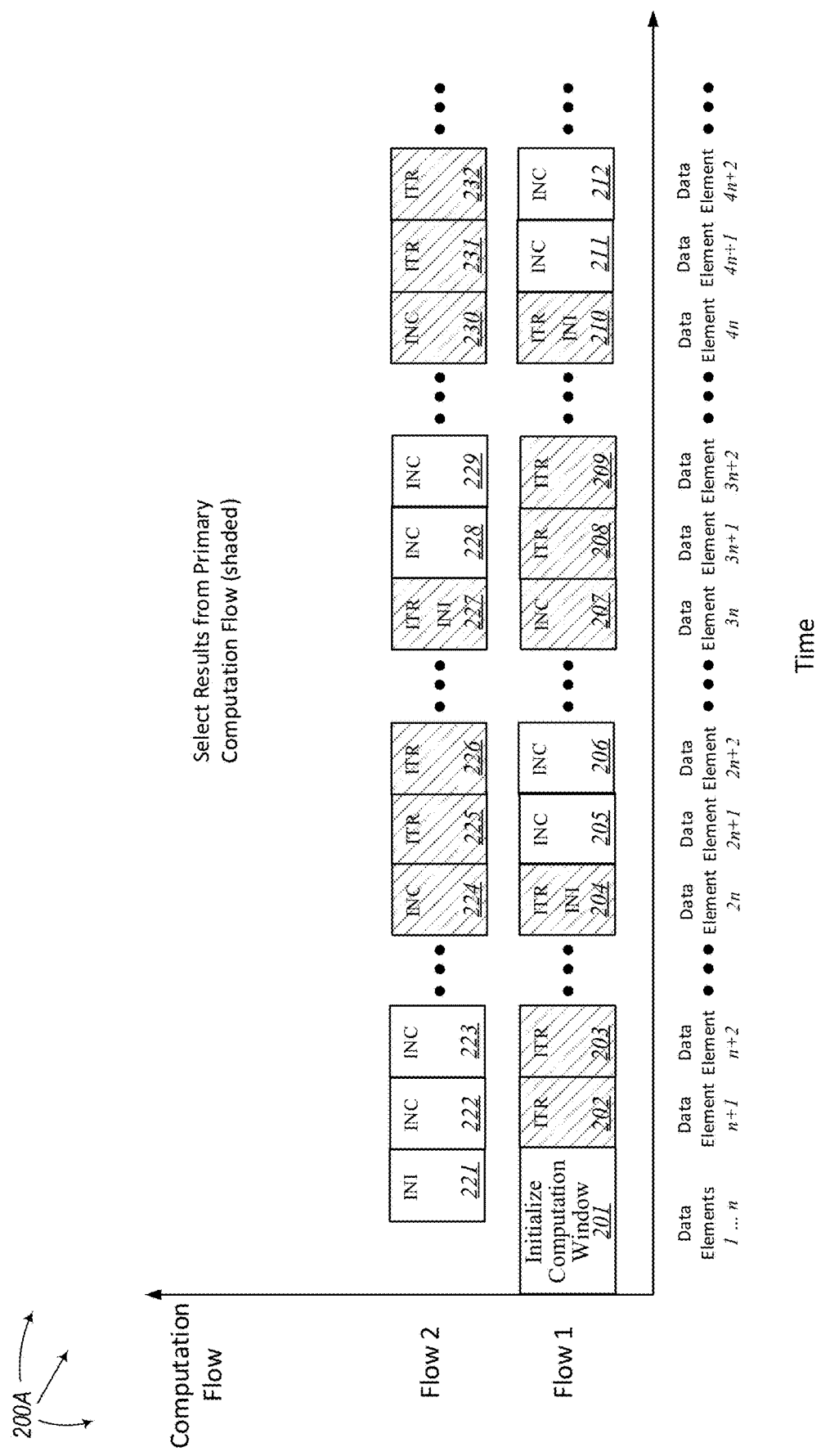
FIG. 2A illustrates an example method 200A for elimination of rounding error accumulation with two computation flows.

FIG. 2A illustrates an example method 200A for elimination of rounding error accumulation with two computation flows. Referring to FIG. 2A, "INI" stands for "initialization", "INC" stands for "incremental calculation", and "ITR" stands for "iterative calculation". While one computation flow, called primary computation flow, performs iterative calculation for a primary computation window of a pre-defined size n (n>1), the other computation flow, called backup computation flow, performs incremental calculation for a backup computation window. The computing system always choose the result generated by the primary computation flow (the shaded blocks in FIG. 2A) as the output of the iterative calculation. Whenever the backup computation window has reached the pre-defined size n, the two computation flows exchange their roles: the backup computation flow which has been performing incremental calculation will begin iterative calculation and become the primary computation flow, and the primary computation flow which has been performing iterative calculation will begin incremental calculation and become a backup computation flow. The primary computation window and the backup computation window exchange their roles accordingly: the primary computation window will be reset to a backup computation window which contains only one data element, and the backup computation window will become the primary computation window which will keep a fixed size n. The computing system always generates the computing result from a computation flow which performs iterative calculation.

Within the description of this disclosure, a computation flow is just a logical process comprising a sequence of operations, which is not the same as the actual process within an operating system. In other words, two computation flows may be carried out separately by two processes/threads in a computing system or even by two computing devices but may also be mixed together and carried out by a single process/thread in a computing system. The two computation flows are driven by data and synchronized by data. Thus, the order of the execution of the two computation flows does not matter, as long as the execution is finished before accessing or receiving the next data element.

For simplicity of description, assume a specific function uses one data element (k=1) as input to perform the iterative calculation. Assume iterative calculation of a specific function needs to be done on computation windows with a pre-defined computation window size n (n>1). Each time a data element is removed and a data element is added to the primary computation window, a new iteration of calculation begins. The primary computation window keeps a fixed size of n. The desired result is the specific function calculated by using all data elements in a primary computation window. Iterative calculation of the specific function is performed by reusing some previously calculated results for a pre-modified computation window so that not all data elements in a modified computation window are used in the calculation of the specific function for the modified computation window, thereby saving computing resources. The two computation flows work in the following ways. For the first n data elements, computation flow 1, which is the primary computation flow, performs initialization of one or more components of the function according to their definitions based on all n data elements in the first primary computation window (201). After certain period of time, the $(n+1)^{th}$ data element is accessed or received. A data element in the primary computation window is removed so that the primary computation window still contains a total of n data elements and the function needs to be calculated again after the data change in the primary computation window. Computation flow 1 begins iterative calculation (202) by using one or more components of the function initialized for the first primary computation window after accessing or receiving the $(n+1)^{th}$ data element. The computing system generates the output from computation flow 1. Computation flow 2 initializes one or more components of the function to be zeros (221) and begins incremental calculation of the function for a backup computation window by using the $(n+1)^{th}$ data element (222). The backup computation window has a size of 1 and now contains just one data element, the $(n+1)^{th}$ data element. After certain period of time, the $(n+2)^{th}$ data element is accessed or received. Computation flow 1 continues the iterative calculation (203), and computation flow 2 continues incremental calculation (223). This process continues until when the $(2n)^{th}$ data element is accessed or received. During this process, the computing system generates the output of iterative calculation from computation flow 1 (from 202, 203, . . . , to 204). At that time point, the backup computation window has reached a size of n, because it contains data elements from the $(n+1)^{th}$ data element, the $(n+2)^{th}$, . . . , to the $(2n)^{th}$ data element, so after incremental calculation (224) of adding the $(2n)^{th}$ data element to the backup computation window, computation flow 1 and computation flow 2 exchange their roles. Computation flow 1 becomes backup computation flow. The computing system will generate the output of iterative calculation from computation flow 2 (225, 226, . . . , to 227). The previous primary computation window is reset to empty, and computation flow 1 begins incremental calculation. This process will repeat as needed. Because the last incremental calculation performed before the exchange is for a computation window of size n, either that result or the result from primary computation window may be generated and used. For example, the computer system may either generate the output from 224 or 204, 227 or 207, 230 or 210. In summary, the two computation flows will alternatively work as a primary computation flow. One of the two computation flow works as a primary computation flow while the other works as a backup computation flow. The primary computation flow performs iterative calculation and its result may be used to generate the output of the iterative calculation. The backup computation flow performs incremental calculation and its result may only be used for the purpose of incremental calculation but not used to generate the output with the exception of the result when the backup computation window reaches size n. Keep in mind that FIG. 2A shows the optimal case of two computation flows, where the number of iterations for iterative calculation performed by two computation flows is the same. In less optimal cases, one computation flow will perform more iterative calculations than the other.

Figure 2B:
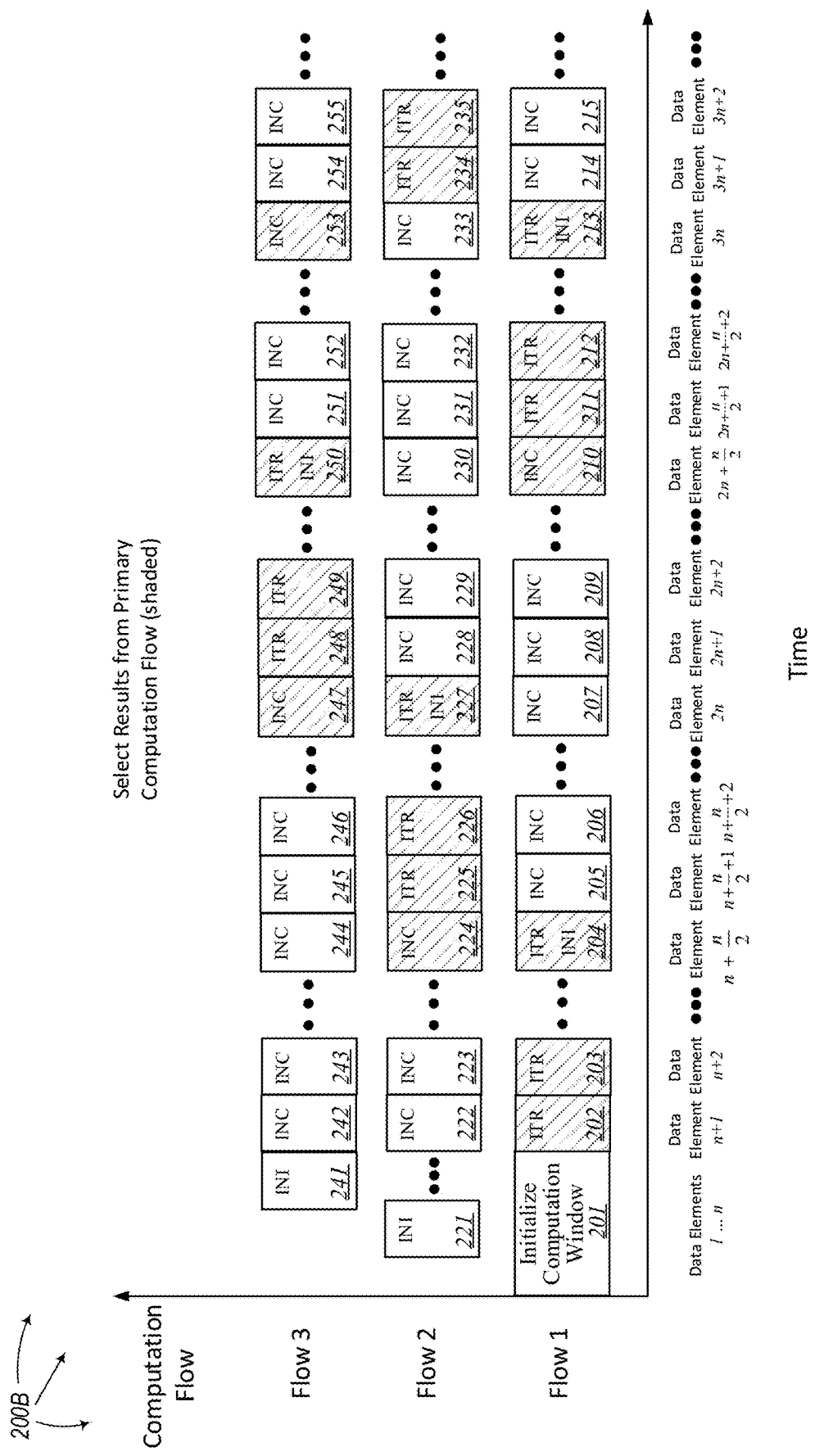
FIG. 2B illustrates an example method 200B for elimination of rounding error accumulation with three computation flows.

FIG. 2B illustrates an example method 200B for elimination of rounding error accumulation with three computation flows. The only difference between method 200A and method 200B is that 200B use one more computation flow so that the number of iterations of iterative calculation performed by the primary computation flow become less to further eliminate the effects of rounding error accumulation. Method 200B may be applied to the case where the size of the primary computation window is large and the effects of the rounding error accumulation is severe. Referring to FIG. 2B, "INT" stands for "initialization", "INC" stands for "incremental calculation", and "ITR" stands for "iterative calculation". In method 200B, three computation flows take in turn the role of a primary computation flow, while two other computation flows work as backup computation flows. Similar to method 200A, the primary computation flow performs iterative calculation, and the two backup computation flows perform incremental calculation started at two different time points. The computing system always generates the output of the iterative calculation from the primary computation flow. The computing results of the two backup computation flows are only used to keep the incremental calculation process running but not used to generate the output with the exception of the result when a backup computation window reaches size n. Referring to FIG. 2B, computation flow 1 takes the role of primary computation flow (202, 203, . . . , to 204) at the beginning, computation flow 2 starts incremental calculation (221, . . . , 222, 223, . . . , to 224) when the $(n/2+1)^{th}$ data element is accessed or received, and computation flow 3 starts incremental calculation (242, 243, . . . , to 244) when the $(n+1)^{th}$ data element is accessed or received. When the $(n+n/2+1)^{th}$ data element is accessed or received, computation flow 1 changes to a backup computation flow and begins to perform incremental calculation (205, 206, . . . , to 207), computation flow 2 changes to primary computation flow and begins to perform iterative calculation (225, 226, . . . , to 227), and computation flow 3 continues to perform incremental calculation (245, 246, . . . , to 247). This process continues until the $(2n)^{th}$ data element is accessed or received. At that time point, the roles of the three computation flows will change again. When the $(2n+1)^{th}$ data element is accessed or received, computation flow 1 continues to perform incremental calculation (208, 209, . . . , to 210), computation flow 2 changes to a backup computation flow and begins to perform incremental calculation (228, 229, . . . , to 230), and computation flow 3 changes to a primary computation flow and begins to perform iterative calculation (248, 249, . . . , to 250). This process continues until the $(2n+n/2)^{th}$ data element is accessed or received. At that time point, the roles of the three computation flows will change again. When the $(2n+n/2+1)^{th}$ data element is accessed or received, computation flow 1 changes to a primary computation flow and begins to perform iterative calculation (211, 212, . . . , to 213), computation flow 2 continues to perform incremental calculation (231, 232, . . . , to 233), and computation flow 3 changes to a backup computation flow and begins to perform incremental calculation (251, 252, . . . , to 253). This process continues until the $(3n+n/2)^{th}$ data element is accessed or received. At that time point, the roles of the three computation flows will change again. When the $(3n+n/2+1)^{th}$ data element is accessed or received, computation flow 1 changes to a backup computation flow and begins to perform incremental calculation (214, 215, . . . ), computation flow 2 changes to a primary computation flow and begins to perform iterative calculation (234, 235, . . . ), and computation flow 3 continues to perform incremental calculation (254, 255, . . . ). Because the last incremental calculation performed before the exchange is for a computation window of size n, either that result or the result from primary computation window may be generated and used. For example, the computer system may either generate the output from 224 or 204, 227 or 247, 250 or 210, 253 or 213. Keep in mind that FIG. 2B shows the optimal case of three computation flows, where the number of iterations for iterative calculation performed by each computation flow is the same. In less optimal cases, the number of iterations for iterative calculation performed by different computation flows are not equal.

Figure 2C:
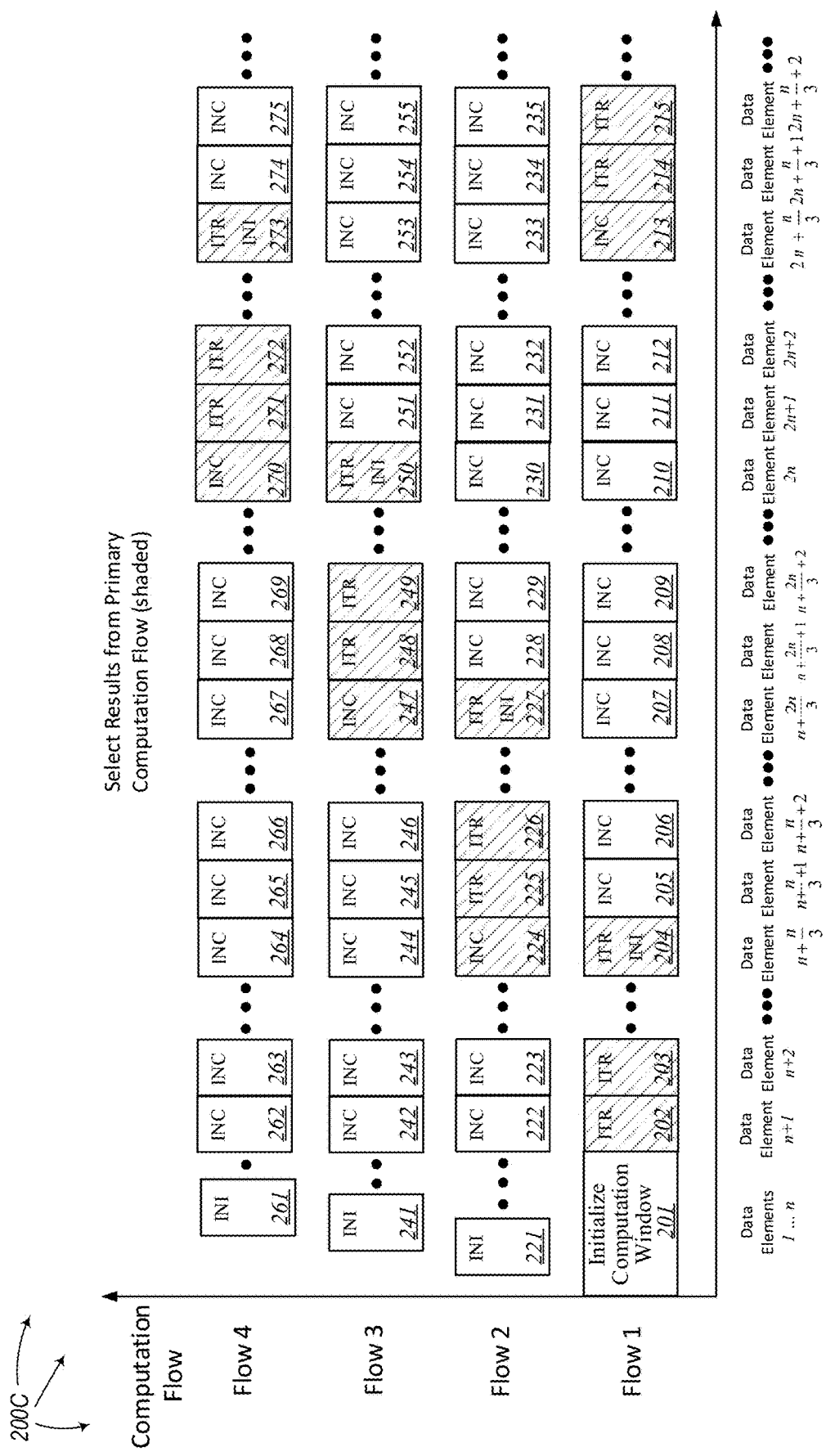
FIG. 2C illustrates an example method 200C for elimination of rounding error accumulation with four computation flows.

FIG. 2C illustrates an example method 200C for elimination of rounding error accumulation with four computation flows. The only difference between methods 200A, 200B and method 200C is that 200C uses more computation flow(s) so that the number of iterations of iterative calculation performed by the primary computation flow become less to further eliminate the effects of rounding error accumulation. Method 200C may be applied to the case where the size of the primary computation window is large and the effects of the rounding error accumulation is severe. Referring to FIG. 2C, "INT" stands for "initialization", "INC" stands for "incremental calculation", and "ITR" stands for "iterative calculation". In method 200C, four computation flows take in turn the role of a primary computation flow, while three other computation flows work as backup computation flows. Similar to methods 200A and 200B, the primary computation flow performs iterative calculation, and the three backup computation flows perform incremental calculation started at three different time points. The computing system always generates the output of the iterative calculation from the primary computation flow. The computing results of the three backup computation flows are only used for keeping the incremental calculation process running but not used to generate the output with the exception of the result when a backup computation window reaches size n. Referring to FIG. 2C, computation flow 1 takes the role of primary computation flow (202, 203, . . . , to 204) at the beginning, computation flow 2 starts incremental calculation (221, . . . , 222, 223, . . . , to 224) when the $(n/3+1)^{th}$ data element is accessed or received, computation flow 3 starts incremental calculation (242, 243, . . . , to 244) when the $(2n/3+1)^{th}$ data element is accessed or received, and computation flow 4 starts incremental calculation (262, 263, . . . , to 264) when the $(n+1)^{th}$ data element is accessed or received. When the $(n+n/3+1)^{th}$ data element is accessed or received, computation flow 1 changes to a backup computation flow and begins to perform incremental calculation (205, 206, . . . , to 207), computation flow 2 changes to primary computation flow and begins to perform iterative calculation (225, 226, . . . , to 227), computation flow 3 continues to perform incremental calculation (248, 249, . . . , to 250), and computation flow 4 continues to perform incremental calculation (265, 266, . . . , to 267). This process continues until the $(n+2n/3)^{t}$ data element is accessed or received. At that time point, the roles of the four computation flows will change again. When the $(n+2n/3+1)^{th}$ data element is accessed or received, computation flow 1 continues to perform incremental calculation (208, 209, . . . , to 210), computation flow 2 changes to a backup computation flow and begins to perform incremental calculation (228, 229, . . . , to 230), computation flow 3 changes to a primary computation flow and begins to perform iterative calculation (248, 249, . . . , to 250), and computation flow 4 continues to perform incremental calculation (268, 269, . . . , to 270). This process continues until the $(2n)^{th}$ data element is accessed or received. At that time point, the roles of the four computation flows will change again. When the $(2n+1)^{th}$ data element is accessed or received, computation flow 1 continues to perform incremental calculation (211, 212, . . . , to 213), computation flow 2 continues to perform incremental calculation (231, 232, . . . , to 233), and computation flow 3 changes to a backup computation flow and begins to perform incremental calculation (251, 252, . . . , to 253), and computation flow 4 changes to a primary computation flow and begins to perform iterative calculation (271, 272, . . . , to 273). This process continues until the $(2n+n/3)^{th}$ data element is accessed or received. At that time point, the roles of the four computation flows will change again. When the $(2n+n/3+1)^{th}$ data element is accessed or received, computation flow 1 changes to a primary computation flow and begins to perform iterative calculation (214, 215, . . . ), computation flow 2 continues to perform incremental calculation (234, 235, . . . ), and computation flow 3 continues to perform incremental calculation (254, 255, . . . ), and computation flow 4 changes to a backup computation flow and begins to perform incremental calculation (274, 275, . . . ). Because the last incremental calculation performed before the exchange is for a computation window of size n, either that result or the result from primary computation window may be generated and used. For example, the computer system may either generate the output from 224 or 204, 227 or 247, 250 or 270, 273 or 213. Keep in mind that FIG. 2C shows the optimal case of four computation flows, where the number of iterations for iterative calculation performed by each computation flow is the same. In less optimal cases, the number of iterations for iterative calculation performed by different computation flows are not equal.

For simplicity of description, example methods 200A, 200B, and 200C use the smallest data unit (a single data element) to modify the primary computation window (i.e., by adding a single data element and removing a single data element) and the backup computation window(s) (i.e., by adding a single data element). Those methods can be easily extended to use larger data unit to modify the primary computation window and the backup computation window(s). For example, each time r (r>1) data elements are added to and r data elements are removed from the primary computation window and r data elements are added to the backup computation window(s). As long as each of backup computation windows has an initial size of n (mod r) and starts at a different time point, they will reach an exact size of n respectively at some time points. It is noted that in the three example methods, the backup computation flow(s) start to perform incremental calculation at different time points at very beginning. This is not the only way to start the backup computation flow. The backup computation flow(s) may also start at the time when performing initialization for one or more components of a function: instead of using all n data elements to perform the initialization, each backup computation window is initialized with different sizes which is equal to n (mod r) plus a multiple of r and each backup computation flow just uses different number of the latest data elements to initialize one or more components of the function and then start incremental calculation.

Figure 3:
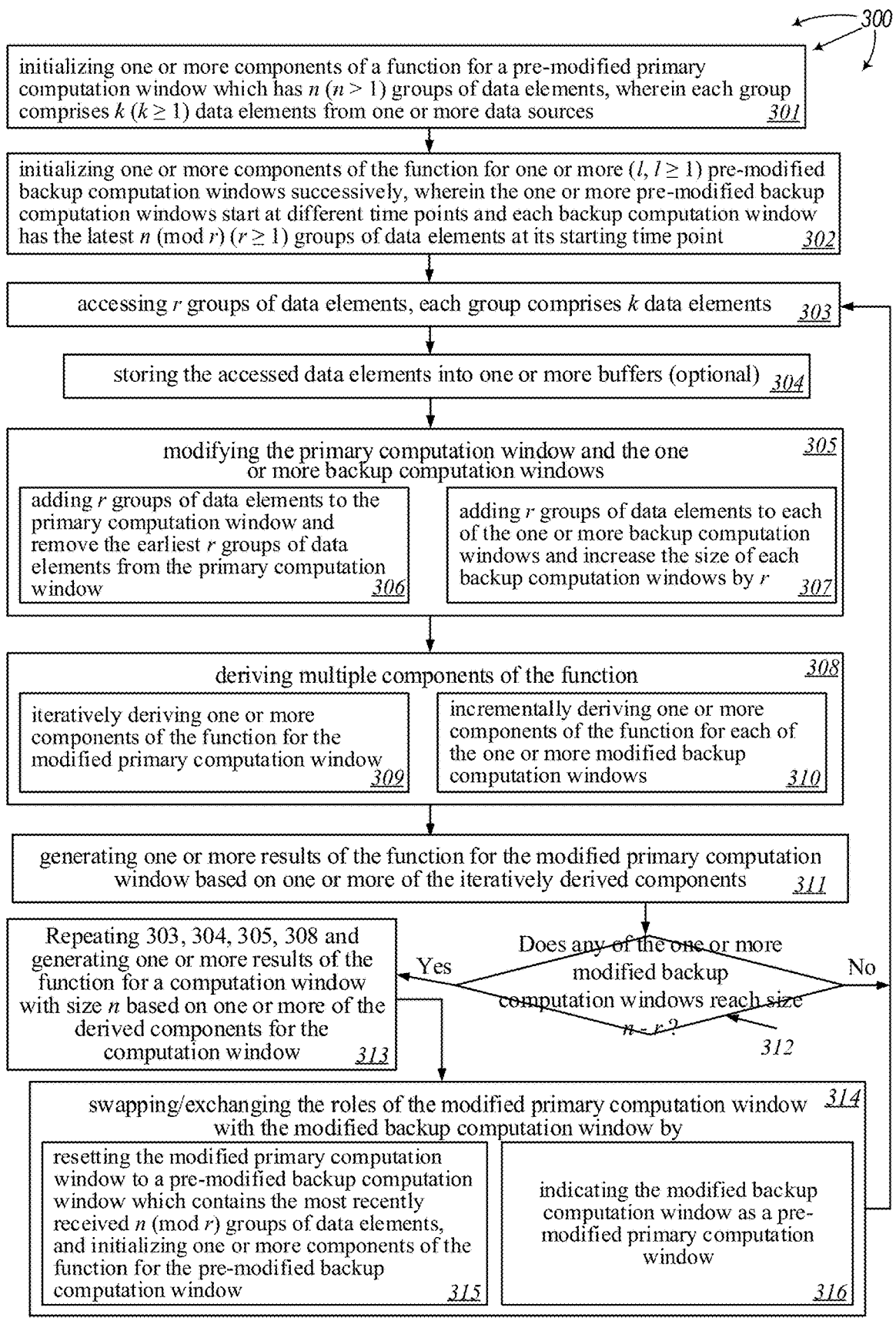
FIG. 3 illustrates a flow chart of an example method 200 for elimination of rounding error accumulation in iterative calculations for Big Data or streamed data.

FIG. 3 illustrates a flow chart of an example method 300 for elimination of rounding error accumulation in iterative calculations for Big Data or streamed data. Method 300 will be described with respect to the example methods 200A, 200B, and 200C.

Method 300 includes initializing one or more components of a function for a pre-modified primary computation window which has n (n>1) groups of data elements, wherein each group of data elements comprises k (k≥1) data elements from one or more data sources (301). For example, referring to 200A in FIG. 2A, the first primary computation window comprises n groups of data element, wherein each group contains a single data element. Computation flow 1 initializes one or more components of a function using the first n data elements (201). Methods 200A, 200B, and 200C show the simplest case, where k=1.

Method 300 includes initializing one or more components of the function for one or more (l, l≥1) pre-modified backup computation windows successively, wherein the one or more pre-modified backup computation windows start at different time points and each backup computation window has the latest n (mod r) (r≥1) groups of data elements at its starting time point (302). For example, referring to 200A in FIG. 2A, the computing system initializes one or more components of the function for one (l=1) pre-modified computation window, and since each time one group (r=1) of data elements is added, n (mod r)=0, the pre-modified backup computation window has no data element, and the one or more components may be initialized to zeros. Similar to 200A, 200B in FIG. 2B has one more computation flow, at any time point, there are one primary computation window and two backup computation windows (i.e., l=2). Since each time one group (r=1) of data elements is added, n (mod r)=0, the pre-modified backup computation window has no data element, and the one or more components may be initialized to zeros. Similar to 200B, 200C in FIG. 2C has one more computation flow, at any time point, there are one primary computation window and three backup computation windows (i.e., l=3). Since each time one group (r=1) of data elements is added, n (mod r)=0, the pre-modified backup computation window has no data element, and the one or more components may be initialized to zeros. Methods 200A, 200B, and 200C show the simplest case, where k=1, r=1, but l=1, 2, 3 respectively.

Method 300 includes accessing r groups of data elements (303). For methods 200A, 200B, and 200C, r=1.

Method 300 includes storing accessed data elements into one or more buffers (304). This is an optional operation which is only performed when the one or more data sources comprise a live data stream (not streamed from a storage medium).

Method 300 includes modifying the primary computation window and the one or more backup computation windows (305), including adding r groups of data elements to the primary computation window and remove the earliest r groups of data elements from the primary computation window (306) and adding r groups of data elements to each of the one or more backup computation windows and increase the size of each backup computation windows by r (307).

Method 300 includes deriving multiple components of the function (308), including iteratively deriving one or more components of the function for the modified primary computation window (309) and incrementally deriving one or more components of the function for each of the one or more modified backup computation windows (310).

Method 300 includes generating one or more results of the function for the modified primary computation window based on one or more of the iteratively derived components (311).

Method 300 includes determining if any of the one or more backup computation windows reaches a size of n−r (312).

If no, method 300 includes accessing r groups of data elements to start next iteration of iterative calculation (303, 304, 305, 308, 311, 312 . . . ) if none of the backup computation windows reaches a size of n−r.

If yes, method 300 includes repeating (303, 304, 305, 308) and generating one or more results of the function for a computation window with size n based on one or more of the derived components for the computation window (313).

Method 300 includes swapping/exchanging the modified primary computation window with a modified backup computation window if any of the modified backup computation windows reaches a size of n (314) by resetting the modified primary computation window to a pre-modified backup computation window which contains the most recently accessed n (mod r) groups of data elements, and initializing one or more components of the function for the pre-modified backup computation window (315) and indicating the modified backup computation window as a pre-modified primary computation window (316), and then accessing r groups of data elements to start next iteration of iterative calculation (303, 304, 305, 308, 311, 312 . . . ). For 200A, 200B, and 200C, since r=1, and thus for any n, n (mod r)=0, the modified primary computation window will be reset to empty (i.e., contains 0 data elements), and one or more components will be initialized to zeros.

What is claimed:

1. A method for eliminating rounding error accumulation in iterative calculation of a function, the method comprising:

a. initializing, by a computing-device-based computing system comprising one or more computing devices and one or more storage media, and each of the one or more computing devices comprising one or more processors, one or more components of a function for a pre-modified primary computation window which has a size of n (n>1) and comprises n groups of data elements, wherein each group comprises k (k≥1) data elements from one or more data sources accessible by the computing-device-based computing system;

b. initializing, by the computing-device-based computing system, one or more components of the function for each of one or more, l (l≥1), pre-modified backup computation windows successively, wherein the one or more pre-modified backup computation windows start at different time points and each pre-modified backup computation window has an initial size of n (mod r) (r≥1) and comprises the latest n (mod r) groups of data elements from the one or more data sources at each respective starting time point;

c. accessing, by the computing-device-based computing system and from the one or more data sources, r groups of data elements to be added to the pre-modified primary computation window, wherein each group of data elements comprises k data elements;

d. modifying, by the computing-device-based computing system, the pre-modified primary computation window by:
  removing the earliest accessed r groups of data element(s) from the pre-modified primary computation window; and
  adding the to-be-added r groups of data element(s) to the pre-modified primary computation window;

e. modifying, by the computing-device-based computing system, the l pre-modified backup computation windows one by one, including modifying each respective one computation window of the l pre-modified backup computation windows, by:
  adding the to-be-added r groups of data element(s) to the respective one pre-modified backup computation window; and
  modifying the respective one pre-modified backup computation window's size by adding r;

f. iteratively deriving, by the computing-device-based computing system and based on the one or more components of the function for the pre-modified primary computation window, one or more components of the function for the modified primary computation window;

g. incrementally deriving, by the computing-device-based computing system and based on the one or more components of the function for each of the/pre-modified backup computation windows, one or more components of the function for each corresponding modified backup computation window of the/modified backup computation windows;

h. generating, by the computing-device-based computing system, at least one computing result of the function for the modified primary computation window based on one or more of the iteratively derived components;

i. performing, by the computing-device-based computing system, steps c, d, e, f, g, and h until any one of the/modified backup computation windows reaches a size equal to n−r;

j. performing, by the computing-device-based computing system, steps c, d, e, f, and g;

k. generating, by the computing-device-based computing system, at least one computing result of the function for a computation window with a size n based on one or more of the derived components; and l. exchanging, by the computing-device-based computing system, the modified primary computation window and a modified backup computation window with a size n by indicating the modified backup computation window as a pre-modified primary computation window and resetting the modified primary computation window to a pre-modified backup computation window, wherein the resetting comprises resetting the modified primary computation window to contain the latest n (mod r) groups of data elements, setting the modified primary computation window size to n (mod r), indicating the modified primary computation window as a pre-modified backup computation window, and initializing one or more components of the function for the pre-modified backup computation window.

2. The computing-system-implemented method of claim 1, wherein l=1.

3. The computing-system-implemented method of claim 1, wherein l=2.

4. The computing-system-implemented method of claim 1, wherein l=3.

5. The computing-system-implemented method of claim 1, wherein l=4.

6. The computing-system-implemented method of claim 1, wherein r=1.

7. The computing-system-implemented method of claim 1, wherein r>1.

8. A computing system, the computing system comprising:
one or more computing devices;
each computing device comprising one or more processors;
one or more storage media; and
one or more calculation modules that, when executed by at least one of the one or more processors, eliminates rounding error accumulation during iterative calculation of a function for a modified computation window of a specified size, wherein the one or more calculation modules configured to:

a. initialize one or more components of a function for a pre-modified primary computation window which has a size of n (n>1) and comprises n groups of data elements, wherein each group comprises k (k≥1) data elements from one or more data sources accessible by the computing system;

b. initialize one or more components of the function for each of one or more, l (l≥1), pre-modified backup computation windows successively, wherein the one or more pre-modified backup computation windows start at different time points and each pre-modified backup computation window has an initial size of n (mod r) (r≥1) and comprises the latest n (mod r) groups of data elements from the one or more data sources at each respective starting time point;

c. access, from the one or more data sources, r groups of data elements to be added to the pre-modified primary computation window;

d. modify the pre-modified primary computation window by:
removing the earliest accessed r groups of data element(s) from the pre-modified primary computation window; and adding the to-be-added r groups of data element(s) to the pre-modified primary computation window;

e. modify the l pre-modified backup computation windows one by one, including to modify each respective one backup computation window of the l pre-modified backup computation windows, by:
adding the to-be-added r groups of data element(s) to the respective one pre-modified backup computation window; and
modifying the respective one pre-modified backup computation window's size by adding r;

f. iteratively derive, based on the one or more components of the function for the pre-modified primary computation window, one or more components of the function for the modified primary computation window;

g. incrementally derive, based on the one or more components of the function for each of the l pre-modified backup computation windows, one or more components of the function for each corresponding modified backup computation window of the l modified backup computation windows;

h. generate at least one computing result of the function for the modified primary computation window based on one or more of the iteratively derived components;

i. perform steps c, d, e, f, g, and h until any one of the l modified backup computation windows reaches a size equal to n−r;

j. perform steps c, d, e, f, and g;

k. generate at least one computing result of the function for a computation window with a size n based on one or more of the derived components; and l. exchange the modified primary computation window and a modified backup computation window with size n by indicating the modified backup computation window as a pre-modified primary computation window and resetting the modified primary computation window to a pre-modified backup computation window, wherein the resetting comprises resetting the modified primary computation window to contain the latest n (mod r) groups of data elements, setting the modified primary computation window size to n (mod r), indicating the modified primary computation window as a pre-modified backup computation window, and initializing one or more components of the function for the pre-modified backup computation window.

9. The computing system of claim 8, wherein l=1.

10. The computing system of claim 8, wherein l=2.

11. The computing system of claim 8, wherein l=3.

12. The computing system of claim 8, wherein l>3.

13. The computing system of claim 8, wherein r=1.

14. The computing system of claim 8, wherein r>1.

15. A computing system program product for use at a configured computing system that comprises one or more computing devices and one or more storage media, each computing device comprising one or more processors, the computing system program product comprising one or more non-transitory computing-device-readable storage media having stored thereon computing-device-executable instructions that, when executed by at least one of the one or more computing devices, cause the configured computing system to perform a method to eliminate rounding error accumulation in iterative calculation of a function for a modified primary computation window of one or more data sources, the method including steps to:

a. initialize, by the configured computing system, one or more components of a function for a pre-modified primary computation window which has a size of n (n>1) and comprises n groups of data elements, wherein each group of data elements comprises k (k≥1) data elements from one or more data sources accessible by the configured computing system;
b. initialize, by the configured computing system, one or more components of the function for each of one or more, l (l≥1), pre-modified backup computation windows successively, wherein the one or more pre-modified backup computation windows start at different time points and each pre-modified backup computation window has an initial size of n (mod r) (r≥1) and comprises the latest n (mod r) groups of data elements from the one or more data sources at each respective starting time point;
c. access, by the configured computing system and from the one or more data sources, r groups of data elements to be added to the pre-modified primary computation window, wherein each group of data elements comprises k data elements;
d. modify, by the configured computing system, the pre-modified primary computation window by:
   removing the earliest accessed r groups of data element(s) from the pre-modified primary computation window; and
   adding the to-be-added r groups of data element(s) to the pre-modified primary computation window;
e. modify, by the configured computing system, the l pre-modified backup computation windows one by one, including to modify each respective one computation window of the l pre-modified backup computation windows, by:
   adding the to-be-added r groups of data element(s) to the respective one pre-modified backup computation window; and
   modifying the respective one pre-modified backup computation window's size by adding r;
f. iteratively derive, by the configured computing system and based on the one or more components of the function for the pre-modified primary computation window, one or more components of the function for the modified primary computation window;
g. incrementally derive, by the configured computing system and based on the one or more components of the function for each of the l pre-modified backup computation windows, one or more components of the function for each corresponding modified backup computation window of the l modified backup computation windows;
h. generate, by the configured computing system, at least one computing result of the function for the modified primary computation window based on one or more of the iteratively derived components;
i. perform, by the configured computing system, steps c, d, e, f, g, and h until any one of the l modified backup computation windows reaches a size equal to n−r;
j. perform, by the configured computing system, steps c, d, e, f, and g;
k. generate, by the configured computing system, at least one computing result of the function for a computation window with a size n based on one or more of the derived components; and
l. exchange, by the configured computing system, the modified primary computation window and a modified backup computation window with size n by indicating the modified backup computation window as a pre-modified primary computation window and resetting the modified primary computation window to a pre-modified backup computation window, wherein the resetting comprises resetting the modified primary computation window to contain the latest n (mod r) groups of data elements, setting the modified primary computation window size to n (mod r), indicating the modified primary computation window as a pre-modified backup computation window, and initializing one or more components of the function for the pre-modified backup computation window.

16. The computing system program product of claim 15, wherein l=1.

17. The computing system program product of claim 14, wherein l=2.

18. The computing system program product of claim 14, wherein l>2.

19. The computing system program product of claim 14, wherein r=1.

20. The computing system program product of claim 14, wherein l>1.

* * * * *